(12) United States Patent
Kardach et al.

(10) Patent No.: US 7,430,673 B2
(45) Date of Patent: Sep. 30, 2008

(54) POWER MANAGEMENT SYSTEM FOR COMPUTING PLATFORM

(75) Inventors: James P. Kardach, Saratoga, CA (US); Barnes Cooper, Aloha, OR (US); Paul Diefenbaugh, Portland, OR (US); Seh Kwa, San Jose, CA (US); Animesh Mishra, Pleasanton, CA (US)

(73) Assignee: Intel Corporation, Santa Clara, CA (US)

( * ) Notice: Subject to any disclaimer, the term of this patent is extended or adjusted under 35 U.S.C. 154(b) by 417 days.

(21) Appl. No.: 11/173,220

(22) Filed: Jun. 30, 2005

(65) Prior Publication Data

US 2007/0005995 A1    Jan. 4, 2007

(51) Int. Cl.
*G06F 1/00* (2006.01)
*G06F 1/26* (2006.01)
*G06F 1/32* (2006.01)

(52) U.S. Cl. ............... 713/300; 713/320; 713/323; 713/324

(58) Field of Classification Search ................. 713/300
See application file for complete search history.

(56) References Cited

U.S. PATENT DOCUMENTS

| 5,754,869 | A | 5/1998 | Holzhammer et al. |
| 2003/0163745 | A1 | 8/2003 | Kardach |
| 2003/0196127 | A1 | 10/2003 | Olsen |
| 2006/0288240 | A1 * | 12/2006 | Kardach et al. .......... 713/300 |

OTHER PUBLICATIONS

PCT Search Report and Written Opinion for PCT/US2006/023691, filed Jun. 16, 2006, mailed Jan. 9, 2007, 12 pgs.

* cited by examiner

*Primary Examiner*—Rehana Perveen
*Assistant Examiner*—Michael J Brown
(74) *Attorney, Agent, or Firm*—Schwegman, Lundberg & Woessner, P.A.

(57) ABSTRACT

A power management system for a computing platform is described. In one embodiment, the power management system provides additional device states which the device controllers of the platform assume when the device controllers are operational but idle. These additional device states are states in which the device controller commits to certain types of inactivity. In another embodiment, the power management system provides additional platform modes which guarantee processor inactivity and/or deference of particular platform events while the mode is in effect.

30 Claims, 8 Drawing Sheets

POWER MANAGEMENT SYSTEM FOR COMPUTING PLATFORM

FIELD OF THE INVENTION

This invention pertains to methods and apparatus for managing power consumption in computing systems.

BACKGROUND

Power consumption is an important issue in computing platforms, especially in mobile platforms such as notebook computers and handheld devices which operate with a battery power supply. In most mobile computing platforms today, the processor is well power managed by periodic power cycling. The majority of other subsystems in the platform (e.g., devices, chipsets, memory, and clocks), however, are usually constrained to remain in a state of readiness even while the processor is powered down, due to the unpredictability of device interrupts and bus master traffic. For example, an interrupt may awaken a sleeping processor before its scheduled wakeup time, and a device needs to be ready in case the processor wants to access it. Peripheral devices also have to be ready to respond to bus cycles generated by any device acting as a bus master. These factors limit the opportunities for effectively reducing power consumption by only power cycling the processor.

DETAILED DESCRIPTION

Figure 1:
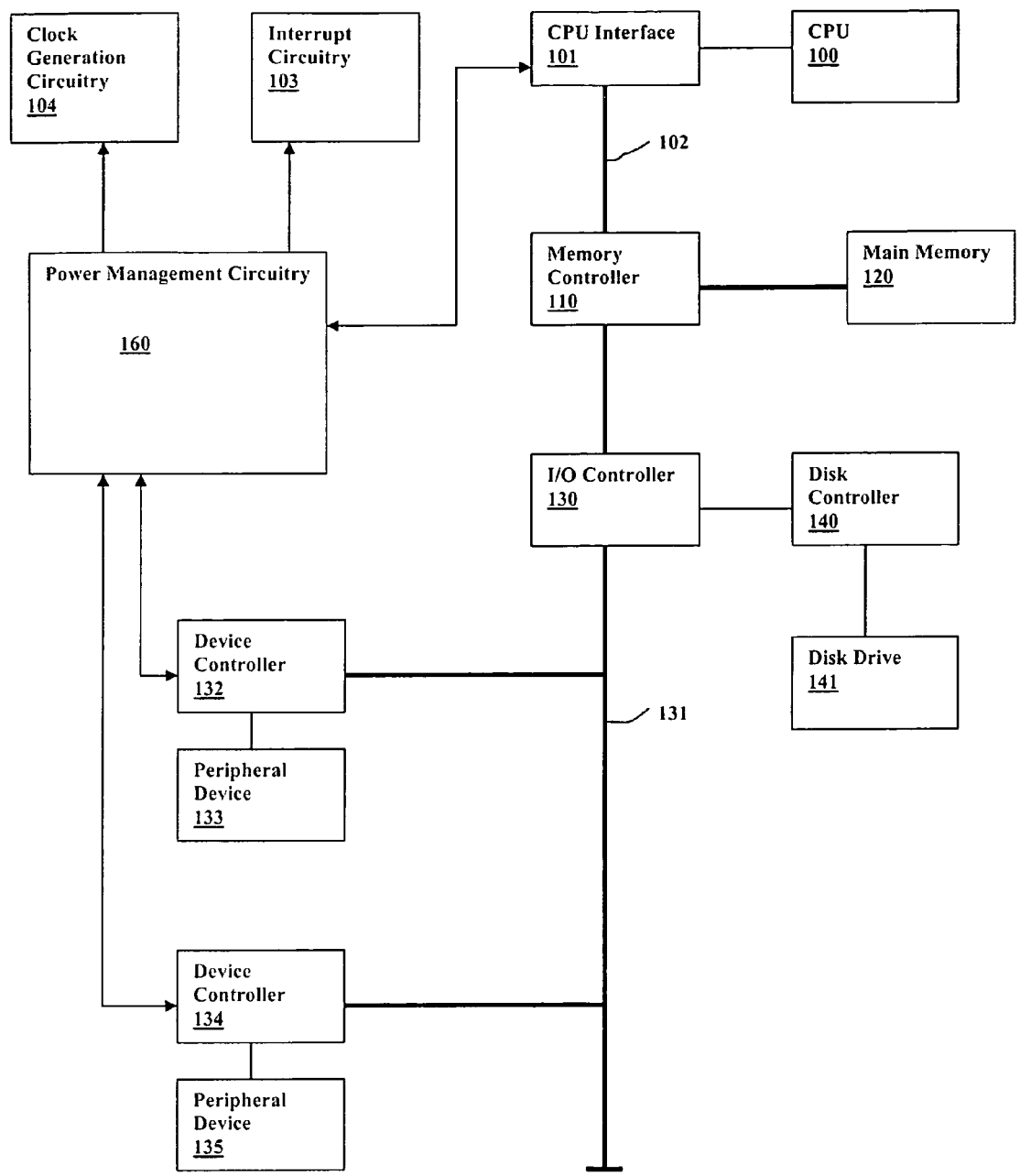
FIG. 1 illustrates basic components of an exemplary computing platform.

FIG. 1 illustrates the basic components of a computing platform that incorporates a power management system according to one embodiment. As the term is used herein, a computing platform is a framework that supports the components necessary to form an operational computing system such as may be implemented, for example, in a laptop or other type of computer, cell phone, or personal data assistant. As such, a computing platform may or may not include a processor (a.k.a., a central processing unit or CPU), a disk drive or other storage device for storing system software, or the system software executed by the CPU. In FIG. 1, the platform provides an interface 101 for connecting a CPU 100 to the platform. In the case of a motherboard platform, for example, the interface 101 may be a socket or slot that provides power, clocking, and interrupt connections to the CPU. A host or front-side bus 102 enables the CPU to communicate with a main memory 120 via memory controller 110. The clock generation circuitry 104 represents circuitry for generating various clock signals of different frequencies used by the CPU and other platform components. Interrupt circuitry 103 represents circuitry for generating interrupt signals which input to the CPU in response to, for example, timer expirations or device requests. Interfaced to the memory controller 110 is an I/O controller 130 to which may be interfaced a disk controller 140 and disk drive 141. The I/O controller 130 also connects the platform to one or more peripheral devices through one or more I/O buses which may be of various types. Shown in the figure is an I/O bus 131 which connects the platform to peripheral devices 133 and 135 through device controllers 132 and 134, respectively. The platform also incorporates power management logic 160 for implementing the power management schemes to be described below. The power management logic 160 may be implemented in various ways (e.g., in the case of a motherboard platform as part of the core chipset) and portions of it may be incorporated into device controllers. In various embodiments, the power management logic 160 defines time intervals during which a device and/or other platform components commit to certain types of inactivity and thus present opportunities for power management. The embodiment of the power management logic 160 as shown in FIG. 1 also has connections to the clock generation and interrupt circuitry by which it may affect the operation of those components.

Computing platforms typically incorporate some sort of power management scheme which power cycles the processor by waking the processor from a low power non-operational state at periodic wakeup intervals with an interrupt. Such schemes are especially important for mobile platforms such as laptop computers which operate on battery power. For example, the Advanced Configuration and Power Interface Specification, Revision 3.0, Sep. 2, 2004 (referred to herein as the ACPI specification) explicitly calls out CPU power states, or C-states: the C0 state represents the working power of the CPU and the C1-C3 states (referred to generically herein as a Cx state) represent low power idle states where the higher number represents a state with lower power and higher recovery latency. For a Pentium-M® processor (manufactured by Intel Corp.), the C0 power is around 15 watts while the C3 power is about 0.2 W. Additionally, the ACPI specification defines device power states numbered D0 through D3 for peripheral devices. D0 is the fully operational or on state, and D1-D3 are low power non-operational states. When a device is in the D0 state, it expects both quick response from the host processor upon generating an interrupt and low latency for system memory transactions (referred to as bus master traffic). When a device is in one of the low power non-operational states D1-D3, register contents of the device are not maintained, and the device driver is responsible for restoring context to the device when it becomes operational again. The periodic wakeup intervals for the processor are usually specified by the operating system (OS) being run by the platform and are therefore also referred to as OS tick intervals, the lengths of which are typically 10-15 ms (e.g., 10 ms for Microsoft Windows XP® and 14 ms for Microsoft Windows 95®. The C-states of the processor are entered every OS tick interval. The platform has a timer which generates an OS tick interrupt which wakes the CPU from an idle low power state Cx, and the OS scheduler then selects a number of tasks to execute while the CPU is active. When the pending tasks are finished, the CPU enters the low power state again until the next scheduled wakeup interrupt or until another type of interrupt occurs which wakes the CPU before the scheduled wakeup.

Figure 2:
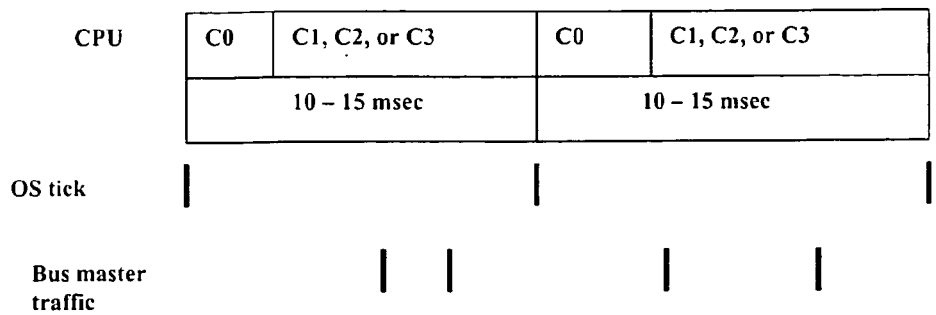
FIG. 2 illustrates an example of CPU power cycling.

FIG. 2 illustrates an example of CPU power cycling where the processor is relatively idle and is shown as waking Lip only at the specified OS tick intervals. After each wakeup event, the OS runs a timer tick interrupt service routine and processes any threads that are in the ready to run state. After completing these tasks, the processor re-enters the low power state and is thus idle until the next interrupt. During the time until the next wakeup interrupt in this example, there is also light bus traffic to main memory from devices that may be in the active D0 state, which is interspersed and delivered to the processor in the form of cache snoops on the host or front-side bus. These random bus cycles, as well as interrupts issued from devices in the D0 state, during what would otherwise be CPU idle time between wakeups disrupt the desired power cycling of the CPU. Also, because the bus master traffic events are purely random (e.g., packets across a LAN component), the majority of the logic in the chipset, memory, devices, as well as the system clock tree normally remain active during these idle periods in order to process the bus master activity with the short latency the active devices expect. If such platform activity could be aligned around the C0 processor window, however, the platform could provide a guaranteed window of time during which these system resources could be powered down.

Described below is a power management system for a computing platform that provides additional reductions in power consumption from that provided by only periodically putting the CPU or peripheral devices in low power non-operational states. Although the description is set forth with reference to CPU and device states as defined in the ACPI specification, it should be appreciated that the power management system may also be incorporated into computing platforms that do not conform to the ACPI specification. In one embodiment, the power management system provides additional device states which the device controllers of the platform assume when the device controllers are operational but idle. These additional device states, referred to herein as idle states, are states in which the device controller commits to certain types of inactivity. In another embodiment, the power management system provides additional platform modes which guarantee processor inactivity and/or deference of particular platform events while the mode is in effect. The idle device states and platform modes may be synchronized with the wakeup intervals of the CPU and used to provide deterministic idle times during which additional platform resources may be power gated.

Active and Idle Windows

Figure 3:
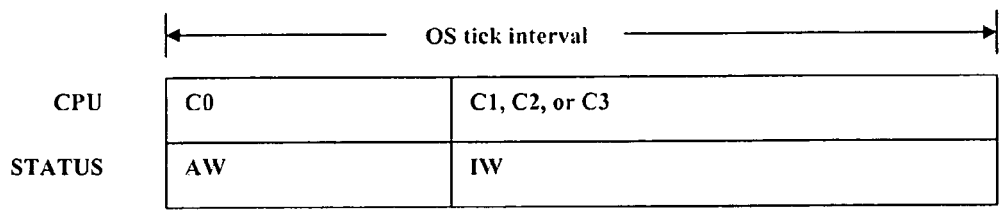
FIG. 3 illustrates division of the CPU wakeup interval into active and idle windows.

One of the functions performed by the power management logic is to define system time intervals for synchronizing devices activity together in order to maximize the opportunity for power management. In one embodiment, the OS timer tick interval as described above is divided into active and idle windows based upon the behavior of the CPU in entering and leaving the C0 and Cx states. FIG. 3 shows an example of the active and idle windows between successive timer tick events (i.e., wakeup interrupts). The active window AW begins when the CPU (or all of the system CPU's in the case of a multi-processor platform) awakens from the Cx state into the C0 state through the timer tick event. Note that while the CPU may awaken into a C0 state from other events, the start of the active window is defined as the entry into the C0 state from the OS timer tick event. The idle window (IW) follows the active window and begins approximately at the time that the CPU enters the Cx state. The active and idle windows thus substantially coincide with the operational and non-operational states, respectively, of the CPU during the interval between wakeup interrupts.

Figure 4:
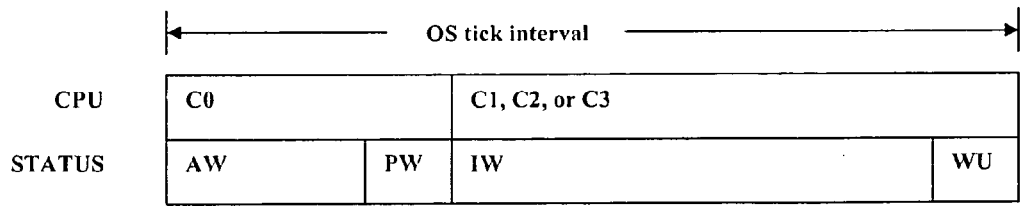
FIG. 4 illustrates another example of division of the CPU wakeup interval into active and idle windows.

FIG. 4 shows another embodiment where a policy window PW is also provided. The policy window is a defined interval that begins when the system CPU first enters a Cx state and immediately precedes the idle window (or can be considered the first part of the idle window). During the policy window, the power management logic may communicate with device controllers and perform logical operations to determine what the platform mode (described below) should be. Also shown in FIG. 4 is a wake-up window WU which follows the idle window (or can be considered the last part of the idle window) and precedes the next active window. Pre-timing logic may be used by devices and their controllers to awaken their logic at some time prior to the OS timer tick event when that device is in an idle state. As different devices, controllers, and resources may have different pre-timing needs, this window's attributes are dependent on the attributes of the controller/device. Because such pre-timing may be based on the OS timer tick logic, however, it is shown as a system window. As will be described, the active and idle windows are then used by device controllers in defining idle device states and by the power management logic in defining platform modes.

Peripheral Device Controllers

Figure 5:
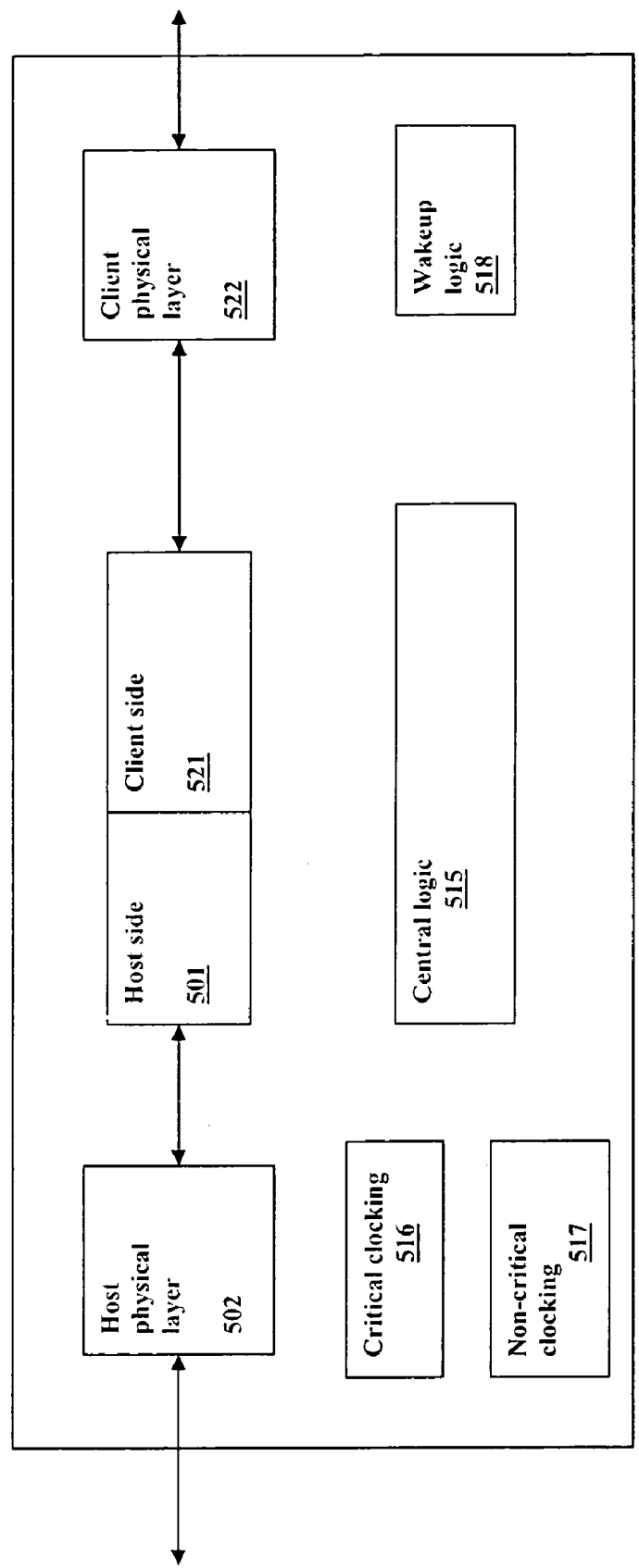
FIG. 5 is a depiction of the components of a representative device controller.

FIG. 5 is a depiction of the components of a representative device controller, which is shown as having a host side and a client side The host side 501 is connected to the platform's system busses so that the controller has access to system resources (e.g., memory and the CPU). The client side 521 is connected to a peripheral device so that the device is accessible by the system. Logic in the host side is responsible for controlling the bus on the host side of the controller, while the logic in the client side is responsible for controlling the bus on the client side of the controller. Interfaced to the host side and client side are physical layers for providing the physical buffering and signaling needed to communicate over a host or client bus, shown as the host physical layer 502 and client physical layer 522, respectively. There may also be blocks of logic shared between the host and controller sides, as represented by a central logic block 515. The rest of the controller consists of clock sources which, in general, may be divided into two types of clocking circuitry: critical clocking 516, representing clocking which is never turned off in a D0 working state, and non-critical clocking 517, representing clocks which can be turned off in the D0 state. Also shown is a wakeup logic block 518 representing circuitry used to place the controller in an out of a non-operational state (i.e., D1-D3), such as when a device is unplugged and plugged into the client physical layer 522.

The power consumed by a peripheral device when it is idle but in an operational state is referred to as leakage power. One of the functions of the power management system as described herein is to provide windows of time during which certain peripheral device components may be power gated while the device is in an operational but idle state in order to reduce leakage power. As the term is used herein, power gating refers to powering down only those components which can be re-powered without loss of context (e.g., combinational logic). This is in contrast to the powering down of a device to a non-operational or off state (i.e., D1-D3 states) where the system software is responsible for saving logic states and restoring context when the device again becomes operational. In a typical device controller, less than 15% of the logic circuitry is made up of registers, thus allowing over 85% of the logic to be turned off without loss of context. Two other sources of power leakage in a device controller besides combinational (i.e., stateless) logic are the physical layers and the clocking circuitry. It is desirable to be able to power down the controller's client physical layer when the device is idle even if the host physical layer should remain active in order to allow the CPU to access the device. Another large component of platform power is clocking. Many controllers need to generate local clocking signals through PLLs/DLLs (phase-locked loops and delay-locked loops) which source their clocking from external PLLs ultimately driven by crystal oscillators. The non-critical clocking block 517 represents the local clocking circuitry which may be turned off when the device is operational but idle in order to save power.

Figure 6:
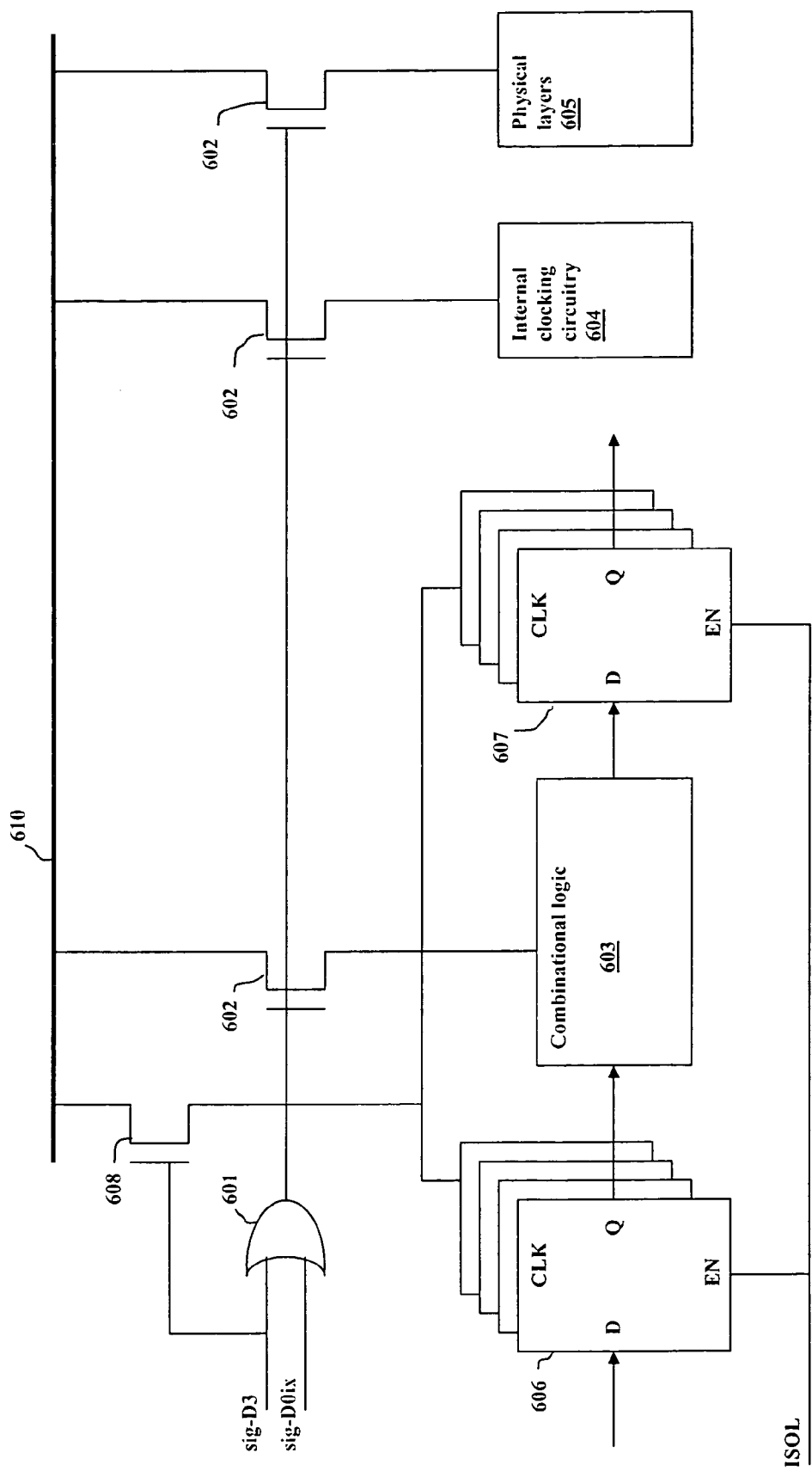
FIG. 6 illustrates an example of the circuitry used to power gate components of the device controller.

FIG. 6 illustrates an example of the circuitry used to power gate components of the device controller. Two input signals are shown, sig-D3 and sig-D0ix. The sig-D3 signal represents a signal intended to put the controller in the D3 non-operational state, and the sig-D0ix signal represents a signal intended to put the controller in one of the idle device states (to be described below) in which stateless controller components are power gated. These signals are ORed together through OR gate 601 to generate a signal that turns off one or more transistors 602 which gate power from a power bus 610. The transistors 602 are shown in this embodiment as gating power to combinational logic circuitry 603, internal clocking circuitry 604, and physical layer circuitry 605 (which represents the host and/or client physical layers). Thus, assertion of either the sig-D3 or sig-D0ix signals results in the powering down of those controller components which can be re-powered without loss of context. When the sig-D3 signal is asserted, power to input registers 606 and output registers 607 is also gated by turning off a transistor 608 and may also power down other sequential logic circuitry in the controller. Also shown is an isolate signal ISOL for tri-state disabling the input and output registers when either of the sig-D3 or sig-D0ix signals is asserted.

Idle Device States

The operational device state is referred to in this description by the same name as the traditional ACPI "device on" or working state D0. When a device is in a D0 state it is considered fully operational and is allowed to generate events (i.e., interrupts) and bus cycles. The power management system as described herein defines one or more idle device states which the device controllers of the platform may assume when the device controllers are operational (i.e., not in an ACPI D1, D2, or D3 state) but idle. In one particular embodiment, designations for these idle states are in the general format of D0ix where x varies from 0-2. D0i0 and D0i1 are defined as transparent idle states, while D0i2 is defined as a visible idle state. As the terms are used herein, a transparent state is one which is hardware dependent and does not rely on OS or driver changes, while a visible state is one in which there is basically an agreement between the device/controller and its driver and therefore does require knowledge of the state by the driver (but not necessarily by the OS). An ACPI-compliant OS may thus see any of the idle device states as being a D0 state, but the device can report to the power management logic that it operates in the D0i0, D0i1, or D0i2 state. These device states are referenced to the OS timer tick interval and substantially aligned to the CPU behavior as it is power cycled (C0 and Cx:C1, C2, C3), where the active window is aligned with the CPU's C0 state and the idle window is aligned with the Cx state.

The idle state D0i 0 is one of two transparent idle states (D0i 0 and D0i1) which are transparent to the operation of the driver and the OS. While a device is in the D0i0 state, it agrees to not generate bus cycles or events during the current OS tick's idle window, but it is capable of responding to CPU accesses to its host interface with a low latency during both idle and active windows. The idle state D0i 1 is also a state which is transparent to the operation of the driver and the OS. When in the D0i1 state, the device will not generate any events or bus cycles and will also defer accesses from the CPU to its host interface until the next active window. The device controller (or the power management policy logic) may thus power gate certain of its components (e.g., physical layers, clocking, and stateless logic) while in the D0i1 state until an active window occurs with a pending request for access by the CPU. The D0i0 and D0i1 states may also be referred to as non-power gated idle states and power gated idle states, respectively. In this embodiment, both the D0i0 and D0i1 states may only be entered during an idle window.

The D0i2 idle state is visible to the device's driver but not necessarily to the operating system so that the OS sees the device as being in a D0 state. The state D0i 2 state is entered when the device communicates to the driver that it can be idle for a given number of OS ticks. At this point the device controller may power gate its stateless logic, clocking, and/or physical layers. After the agreed upon time interval has elapsed, wake-up logic within the device controller will re-power the circuits, and the controller will notify the driver it is awake. While the controller is in the D0i2 state, the driver is responsible for deferring accesses to the device until the agreed upon D0i2 interval has elapsed. The D0i2 state enables devices and their controllers to sleep for extended periods of time in increments of OS tick intervals. This mode of operation may be useful for wireless communication devices that, in their idle states, need to synchronize with an access point or base station periodic beacon at long intervals.

Additionally, a device in a D0i2 state can be designed to create a wake-up event to create an early exit of the D0i2 state. This is device specific and requires an in-band or out-of-band mechanism for the device to communicate to the controller's wake-up logic of the early wake event. As an example, the controller may turn on its client physical layer for every other active window to look for an in-band wake-up event. Another example could be the device having a side-band signal running directly to the wake-up logic to create the early wake-up event without having to power on the client physical layer.

Platform Modes

The power management system may also define platform modes that maximize the benefit of the idle device states described above. In one embodiment as described below, three platform modes are defined: normal mode, doze mode, and nap mode. These modes generally change system wide behavior of the platform to enable a certain type of aggressive power management. The modes may be entered and exited at regular OS tick intervals (e.g., every 10-15 ms) and for the most part are designed to be OS and driver transparent. Some of the modes rely on device states which have driver visible changes, but require no knowledge within the OS itself. In certain embodiments, the necessary driver changes are limited to the mini-port driver that is typically provided by hardware vendors.

Platform modes, like the device states, may be aligned to the OS tick interval. In one embodiment, mode transitions take place during the policy window of the OS tick interval as illustrated in FIG. 4. The policy window (PW), which begins with a timer tick event, may be used by the power management policy logic to communicate with devices to help determine what the mode should be, select the mode, and communicate the selected mode to devices as needed. The selected platform mode then lasts through the subsequent active and idle windows until the next OS timer tick event.

Figure 7:
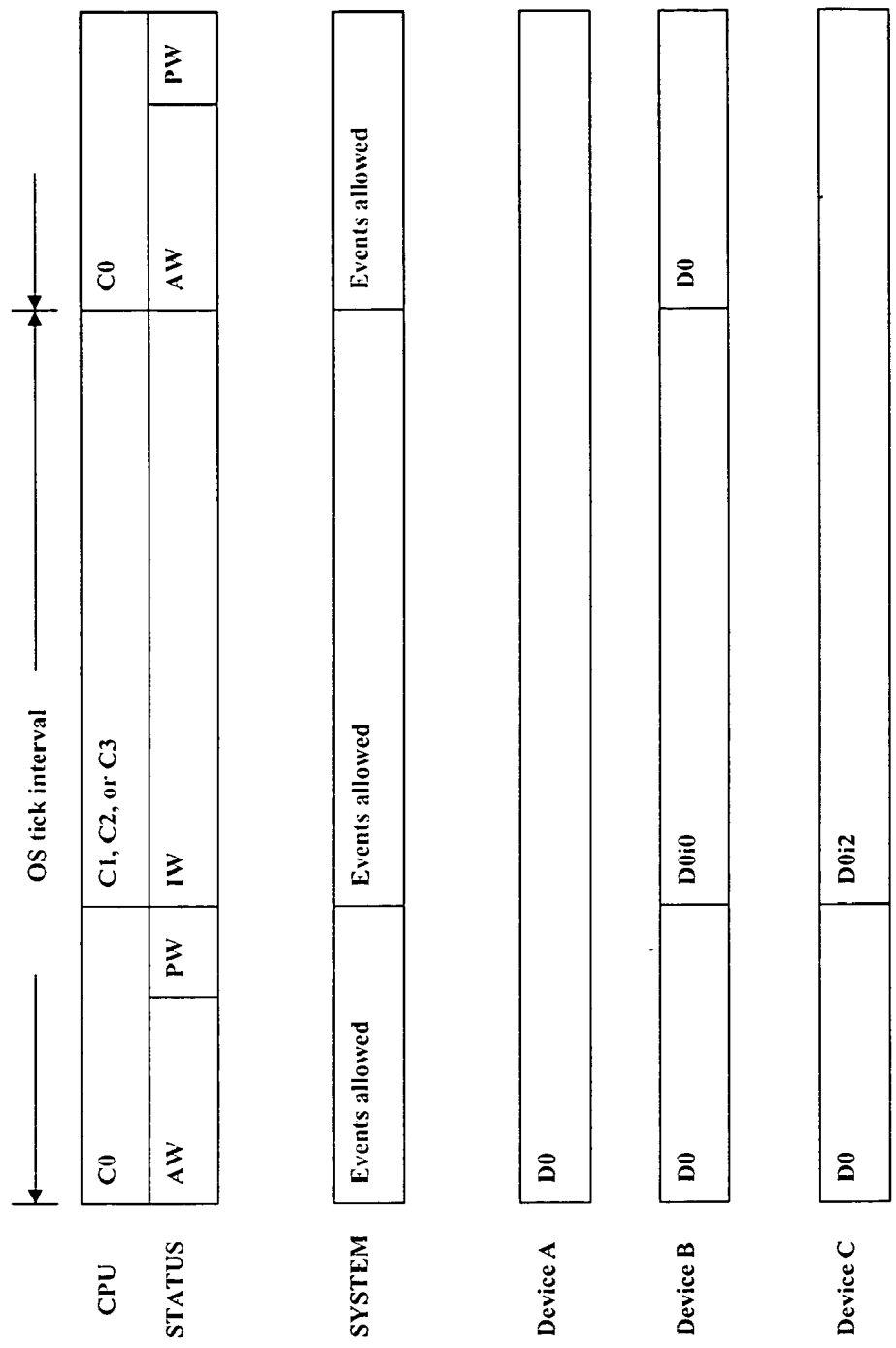
FIG. 7 shows an example of normal platform mode behavior.

Normal mode behavior is similar to how most computing platforms usually operate where devices may generate bus cycles or interrupt events at any time. Because in the normal mode the CPU can take events in the idle window, any device must be prepared to accept an access from the CPU in case such an event is generated for some reason. FIG. 7 shows an example of normal mode behavior with three different devices across a single OS tick. In the active window all three devices are in a D0 state. However upon entering the idle window, device A stays in the D0 state, while device B enters the D0i0 state (so that it will not generate bus cycles or events in the idle window) and device C enters the D0i2 state (so that it will not generate bus cycles or events in the next n OS ticks). Because device C has agreed to not generate bus cycles for n OS ticks, and its driver is aware of this and will cover for it (i.e., defer accesses until the device re-enters the D0 state), it is able to totally power gate its logic, shut off its non-critical clocks, and power down its host physical layer. Depending upon on the activity on the client side of the controller, it may also power the physical layer(s) connecting the controller to its device(s). Because device B has agreed to not generate bus cycles for the rest of the idle window (D0i0 definition), it can aggressively power manage itself; but this is limited by its commitment to respond immediately to accesses from the CPU within the idle window. Because events are enabled, there is the possibility the CPU can awaken in the idle window and try to access the device. Because power management of the controller/device in the D0i0 state must allow for timely CPU accesses, the power saving ability of the D0i0 state is limited in the normal mode. The doze mode is introduced as a platform mode of operation that provides increased opportunity for device power management in this situation.

Figure 8:
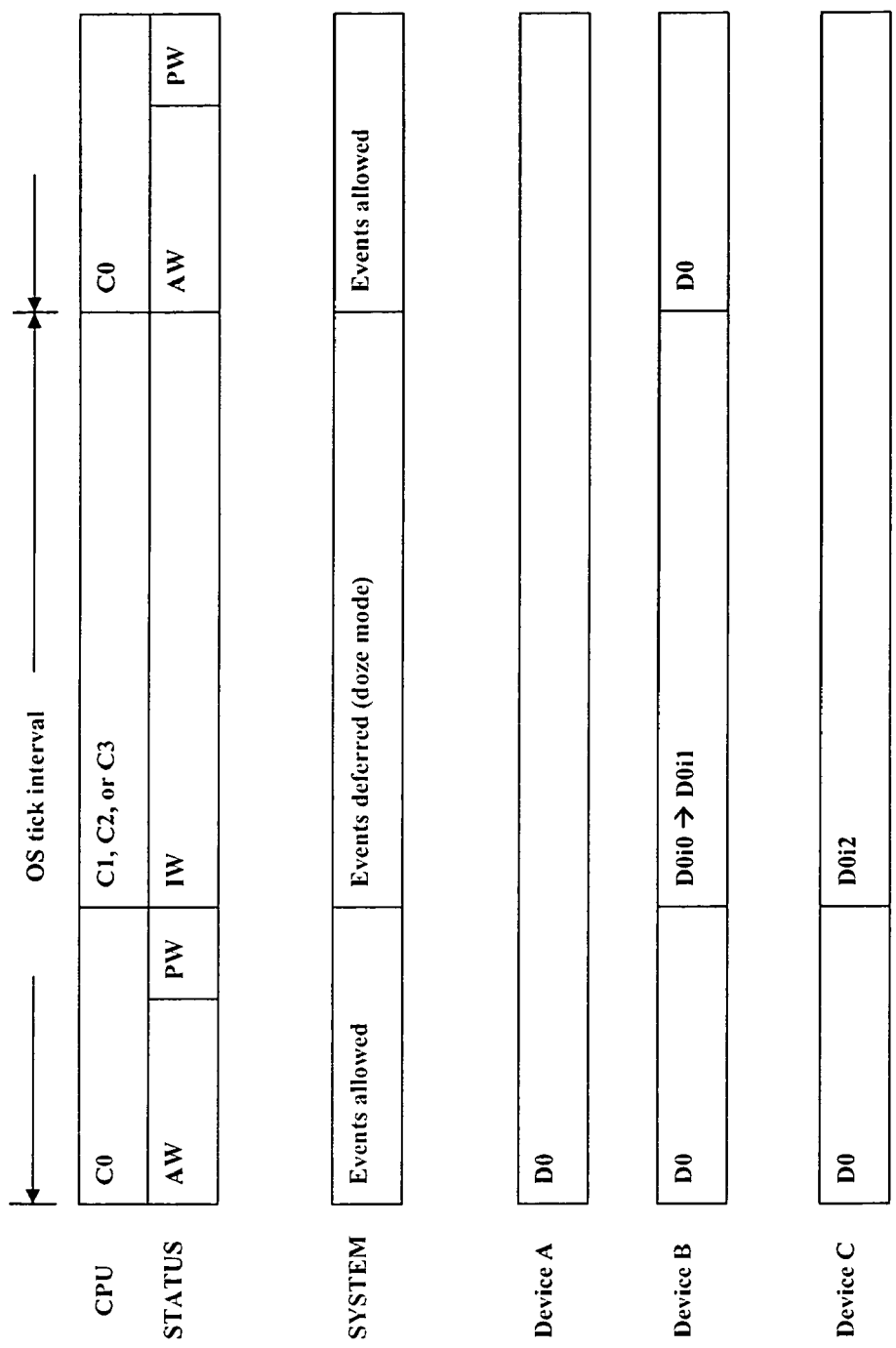
FIG. 8 illustrates an example of doze mode operation.

The doze mode is a platform mode which changes system behavior to maximize the benefit of the idle device states. When the platform enters the doze mode for the current OS tick, platform interrupt events are deferred in idle window until the next active window. The deferring of interrupts creates a deterministic idle time for devices in the D0i0 state which is equal to the idle window of that OS tick. This is because the processor(s) in the system will not be awakened until the next active window. The devices in the platform will therefore not be accessed by the host processor until the next active window. This facilitates aggressive active power management, as the device knows exactly when the idle window starts, knows exactly when the idle window ends, and can create pre-timing logic to awaken power-gated logic and clocks such that they are ready just in time for the following active window. FIG. 8 illustrates an example of doze mode operation with three devices. In this case device A is still active and has decided to stay in the active D0 state for this OS tick, device B has decided to enter the D0i0 state, and device C has decided to enter into the active idle D0i2 state. During the policy window the platform has decided that it will enter a doze mode and will defer events during the idle window till the next active window. This has no effect on device C in the D0i2 state, but device B no longer has to be concerned with a request from the CPU for access until the next active window. Logic in the device B controller (or the power management policy logic of the platform) may therefore power gate its logic (so that no context is lost), clocking circuitry, and/or physical layers to result in additional power savings. This is equivalent to putting the device into the D0i1 state as defined above.

The nap mode is another platform mode which changes system behavior to maximize the benefit of the idle device states. When the platform enters the nap mode for the current OS tick, platform events and bus cycles are deferred in idle window until the next active window. As with the doze mode, the deferring of interrupts creates a deterministic idle time for devices in the D0i0 state equal to the idle window of that OS tick and allows them to effectively transition to the D0i1 state. The deferring of bus cycles guarantees that centralized resources used for a particular branch of the platform are not being used and can therefore be aggressively power gated. Such resources include centralized backbone busses and clocking circuits. A computing platform typically has a clocking tree, where controllers are driven by internal clocks which are sourced by external clocks whose clocks are generated by system PLLs. Most platforms can control the controller clocks from the external clocks by starting or stopping the latter but have to leave the PLLs on (which is the majority of the power) because they take a long time to settle once turned on and a single PLL controls so many on-chip controllers it is difficult to estimate what controller might need a clock at any given time. If bus cycles are deferred for a pre-determined time as in the nap mode, however, these PLLs may be power gated and turned on when the nap mode is exited with an adequate preceding warm up time.

In one embodiment, the power management policy logic is configured to put the platform into the nap mode if all device controllers interfaced to the platform by the I/O bus are detected as being in an idle or low power state. If the platform is in the nap mode, the power management policy logic may then be configured to power gate the I/O bus and/or power gate phase-locked or delay-locked loops for generating clock signals used by the device controllers.

Figure 9:
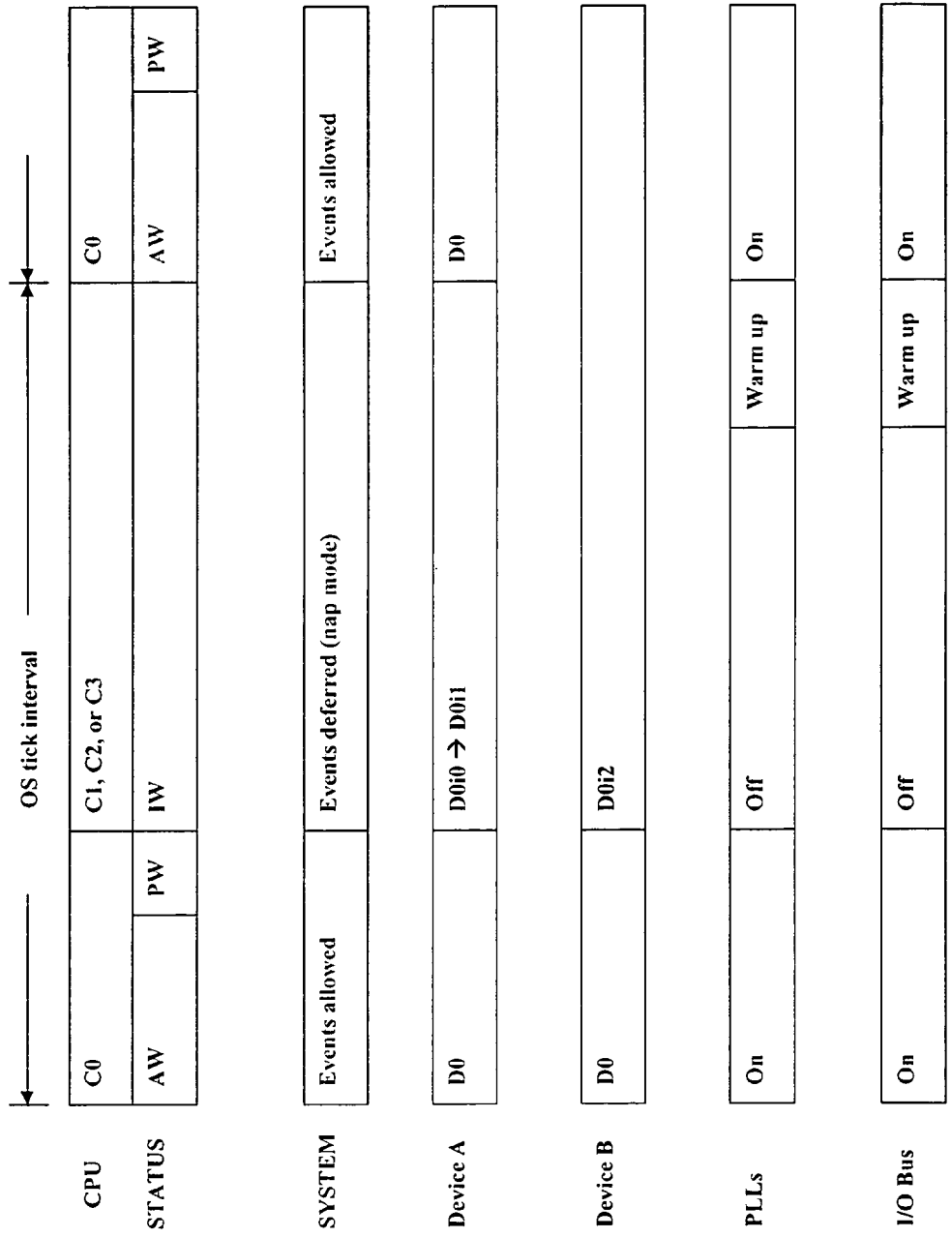
FIG. 9 illustrates an example of nap mode operation.

FIG. 9 illustrates an example of nap mode operation with two devices. In this case device A has decided to enter the D0i0 state and device B has decided to enter into the D0i2 state. During the policy window, the power management policy logic has noted that all of the devices on this branch of the platform have agreed not to generate bus cycles or events, and can therefore power-gate central resources used by the controllers of the devices by entering into the nap mode. Such resources may include the PLLs/DLLs and the I/O bus used by the device controllers which are powered down during the idle window and powered back up during a warm up window that precedes the next active window. As with the doze mode, entering the nap mode also defers events until the next active window and allows device A to transition to the D0i1 state.

Figure 10:
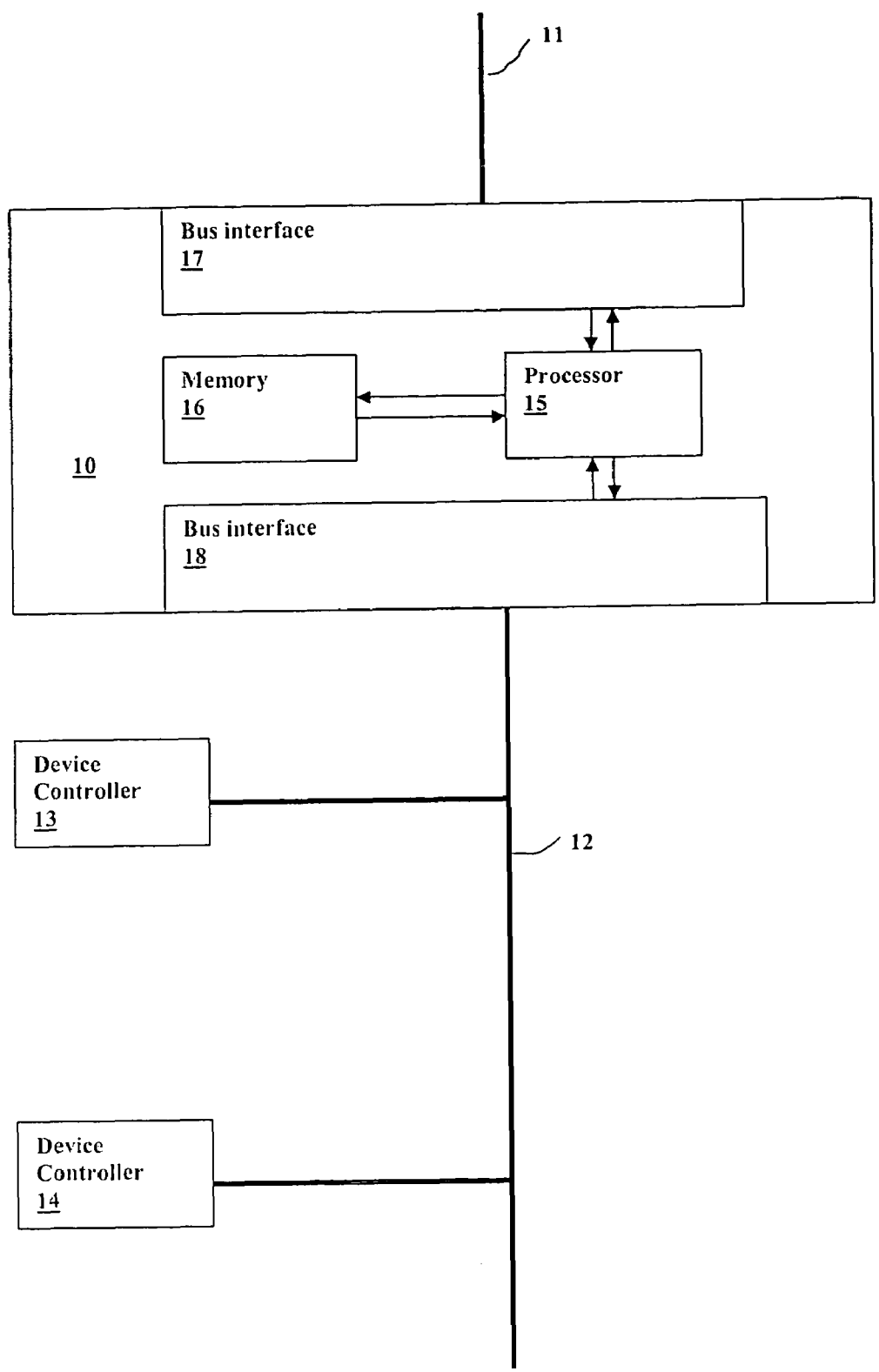
FIG. 10 shows an embodiment of power management logic incorporated into a bus controller.

As aforesaid, the power management logic may be implemented in various different ways, depending upon the particular computing platform. For example, the power management logic may constitute part of the core chipset of a computer motherboard. Portions of the power management logic may also be incorporated into device controllers that are interfaced to the platform. FIG. 10 shows an embodiment in with the power management logic is implemented wholly or partially as part of a bus controller 10. The bus controller 10 interfaces a host bus 11 to an I/O bus 12. Interfaced to the I/O bus 12 are shown two representative device controllers 13 and 14 which are used to connect peripheral devices to the I/O bus. The bus controller 10 in this embodiment is implemented as a processor 15, which executes instructions contained in a memory 16 (e.g., a ROM or other processor-readable storage medium) and communicates with the host and I/O busses via bus interfaces 17 and 18, respectively. The memory 16 may be made to contain processor-executable instructions for performing any of the power management logic functions as described above.

Although the invention has been described in conjunction with the foregoing specific embodiment, many alternatives, variations, and modifications will be apparent to those of ordinary skill in the art. Such alternatives, variations, and modifications are intended to fall within the scope of the following appended claims.

What is claimed is:

1. A computing platform, comprising:
    an interface to connect a central processing unit (CPU) to the platform;
    one or more device controllers interfaced to the platform by a host I/O bus;
    system clocking and interrupt generation circuitry to generate wakeup interrupts at specified wakeup intervals that periodically wake the CPU from a low power non-operational state and put the CPU in an operational state, the CPU then being returned to the non-operational state until the next wakeup interrupt or other interrupt;
    power management policy logic to define active and idle windows which substantially coincide with the operational and non-operational states, respectively, of the CPU during the interval between wakeup interrupts; and,
    circuitry incorporated into the device controller and interfaced to the power management policy logic to put the device controller into an idle state during an idle window, wherein an idle state is defined as a state in which the device controller generates no interrupts or bus traffic.

2. The platform of claim 1 wherein the power management policy logic is capable of putting the platform into a doze mode during an idle window, wherein the doze mode is defined as a mode during which interrupts to the CPU are deferred until the next active window.

3. The platform of claim 2 wherein the device controller is configured to power gate portions of its circuitry during the idle state if the platform is in the doze mode.

4. The platform of claim 3 wherein the device controller is configured to power gate its non-critical logic and clocking circuitry while maintaining the contents of internal registers during the idle state if the platform is in the doze mode.

5. The platform of claim 3 wherein the device controller is configured to power gate a physical layer which interfaces the device controller to a peripheral device during the idle state if the platform is in the doze mode.

6. The platform of claim 1 wherein the power management policy logic is capable of putting the platform into a nap mode during an idle window, wherein the nap mode is defined as a mode during which interrupts to the CPU and I/O bus cycles are deferred until the next active window.

7. The platform of claim 6 wherein the power management policy logic is configured to put the platform into the nap mode if all device controllers interfaced to the platform by the I/O bus are detected as being in an idle or low power state.

8. The platform of claim 7 wherein the power management policy logic is configured to power gate the I/O bus if the platform is in the nap mode.

9. The platform of claim 7 wherein, if the platform is in the nap mode, the power management policy logic is configured to power gate phase-locked or delay-locked loops for generating clock signals used by the device controllers.

10. The platform of claim 1 wherein the circuitry for putting the device controller into an idle state is capable of putting the device controller into a non-power gated idle state or a power gated idle state during an idle window, wherein a non-power gated idle state is defined as a state in which the device controller will generate no interrupts or bus traffic but is responsive to accesses from the CPU, and a power gated idle state is defined as a state lasting for a specified number of consecutive wakeup intervals in which portions of the device controller's circuitry are power gated.

11. The platform of claim 10 wherein the device controller is configured to communicate its power gated idle state to a driver executed by the CPU which may then defer CPU accesses of the device controller until it exits the power gated idle state.

12. The platform of claim 10 wherein the device controller is configured to power gate its non-critical logic and clocking circuitry while maintaining the contents of internal registers during the power gated idle state.

13. The platform of claim 10 wherein the device controller is configured to power gate a physical layer which interfaces the device controller to a device during the power gated idle state.

14. The platform of claim 13 wherein the physical layer power gated by the device controller during the power gated idle state is a wireless link and wherein the specified number of consecutive wakeup intervals that the device controller remains in the power gated idle state is selected to be synchronized with a beacon transmitted by an access point.

15. The platform of claim 1 wherein:
    the power management policy logic is capable of putting the platform into a doze mode or a nap mode during an idle window, wherein the doze mode is defined as a mode during which interrupts to the CPU are deferred until the next active window and the nap mode is defined as a mode during which interrupts to the CPU and I/O bus cycles are deferred until the next active window;
    the circuitry to put the device controller into an idle state may put the device controller into a non-power gated idle state or a power gated idle state during an idle window, wherein a non-power gated idle state is defined as a state in which the device controller will generate no interrupts or bus traffic but is responsive to accesses from the CPU, and a power gated idle state is defined as a state lasting for a specified number of consecutive wakeup intervals in which portions of the device controller's circuitry are power gated;
    device states and platform modes are communicated between the power management policy logic and the device controllers during a policy window at the start of each idle window;
    the device controller is configured to power gate portions of its circuitry during the idle state if the platform is in the doze mode;
    the power management policy logic is configured to put the platform into the nap mode when all device controllers interfaced to the platform by the I/O bus are detected as being in an idle or low-power state; and
    if the platform is in the nap mode, the power management policy logic is configured to power gate the I/O bus and to power gate phase-locked or delay-locked loops for generating clock signals used by the device controllers.

16. A power management system for a computing platform, comprising:
    circuitry to define active and idle windows roughly in accordance with whether a processor is in a wakened or low-power state, respectively, as determined by wakeup interrupts; and,
    circuitry to put the platform into a doze mode during an idle window, wherein the doze mode is defined as a mode during which interrupts to the processor are deferred until the next active window.

17. The system of claim 16 further comprising:
   circuitry to put a device controller into an idle state during an idle window, wherein the idle state is defined as a state in which the device controller will generate no interrupts or bus traffic and,
   circuitry to power gate portions of a device controller's circuitry during an idle state if the platform is in the doze mode.

18. The system of claim 17 further comprising circuitry to put the platform into a nap mode during an idle window, wherein the nap mode is defined as a mode during which interrupts to the processor and bus cycles are deferred until the next active window.

19. The system of claim 18 further comprising circuitry to put the platform into the nap mode when all device controllers interfaced to the platform are detected as being in an idle or other inactive state.

20. The system of claim 19 further comprising circuitry to power gating a bus and particular clock generation circuits when the platform is in the nap mode.

21. The system of claim 18 wherein the circuitry to put a device controller into an idle state may put the device controller into a non-power gated idle state or a power gated idle state during an idle window, wherein a non-power gated idle state is defined as a state in which the device controller will generate no interrupts or bus traffic but is responsive to accesses from the CPU, and a power gated idle state is defined as a state lasting for a specified number of consecutive wakeup intervals in which portions of the device controller's circuitry are power gated.

22. A method for managing power in a computing platform, comprising:
   defining active and idle windows in accordance with whether a processor is in a wakened or low-power state, respectively, as determined by operating system (OS) ticks; and,
   putting the platform into a doze mode during an idle window, wherein the doze mode is defined as a mode during which interrupts to the processor are deferred until the next active window.

23. The method of claim 22 further comprising:
   putting a device controller into an idle state during an idle window, wherein the idle state is defined as a state in which the device controller will generate no interrupts or bus traffic and,
   power gating portions of a device controller's circuitry during an idle state if the platform is in the doze mode.

24. The method of claim 23 further comprising putting the platform into a nap mode during an idle window, wherein the nap mode is defined as a mode during which interrupts to the processor and bus cycles are deferred until the next active window.

25. The method of claim 24 further comprising putting the platform into the nap mode when all device controllers interfaced to the platform are detected as being in an idle or other inactive state.

26. The method of claim 24 further comprising power gating a bus and particular clock generation circuits when the platform is in the nap mode.

27. The method of claim 23 further comprising putting a device controller into a non-power gated idle state or a power gated idle state during an idle window, wherein the non-power gated idle state is defined as a state in which the device controller will generate no interrupts or bus traffic but is responsive to accesses from the CPU, and wherein the power gated idle state is defined as a state lasting for a specified number of consecutive wakeup intervals in which portions of the device controller's circuitry are power gated.

28. A system, comprising:
   a central processing unit (CPU);
   one or more device controllers interfaced to the system by a host I/O bus;
   a disk drive;
   system clocking and interrupt generation circuitry to generate wakeup interrupts at specified wakeup intervals that periodically wake the CPU from a low power non-operational state and put the CPU in an operational state, the CPU then being returned to the non-operational state until the next wakeup interrupt or other interrupt;
   power management policy logic to define active and idle windows which substantially coincide with the operational and non-operational states, respectively, of the CPU during the interval between wakeup interrupts; and,
   circuitry incorporated into the device controller and interfaced to the power management policy logic to put the device controller into an idle state during an idle window, wherein an idle state is defined as a state in which the device controller generates no interrupts or bus traffic.

29. The system of claim 28 wherein the power management policy logic is capable of putting the system into a doze mode during an idle window, wherein the doze mode is defined as a mode during which interrupts to the CPU are deferred until the next active window.

30. The system of claim 29 wherein the device controller is configured to power gate portions of its circuitry during the idle state if the system is in the doze mode.

* * * * *